United States Patent [19]
Dismukes et al.

[11] Patent Number: 5,643,987
[45] Date of Patent: *Jul. 1, 1997

[54] SYNTHESIS OF MICROPOROUS CERAMICS

[75] Inventors: John Pickett Dismukes, Annandale; Jack Wayne Johnson, Clinton, both of N.J.; Edward William Corcoran, Jr., Easton, Pa.; Joseph Vallone, Roselle, N.J.; James J. Pizzulli, Jr., Whitehouse Station, N.J.; Michael P. Anderson, Clinton, N.J.

[73] Assignee: Exxon Research and Engineering Company, Florham Park, N.J.

[*] Notice: The portion of the term of this patent subsequent to May 24, 2014, has been disclaimed.

[21] Appl. No.: 248,290

[22] Filed: May 24, 1994

[51] Int. Cl.$^6$ .......... C04B 38/00; C04B 35/52; C04B 35/56; C08L 85/04
[52] U.S. Cl. .......... 524/442; 501/80; 501/88; 501/92; 524/588; 524/789; 524/857; 524/858; 524/864
[58] Field of Search .......... 501/80, 88, 92; 524/857

[56] References Cited

U.S. PATENT DOCUMENTS

| | | | |
|---|---|---|---|
| 4,833,107 | 5/1989 | Kaya et al. | 501/97 |
| 4,835,207 | 5/1989 | Semen et al. | 524/443 |
| 4,891,340 | 1/1990 | Semen et al. | 501/88 |
| 4,937,304 | 6/1990 | Ayama et al. | 528/34 |
| 4,942,145 | 7/1990 | Moehle et al. | 501/90 |
| 4,950,381 | 8/1990 | Takeuchi et al. | 528/10 |
| 5,006,492 | 4/1991 | Semen et al. | 501/97 |

FOREIGN PATENT DOCUMENTS

| | | |
|---|---|---|
| 0200326A1 | 12/1986 | European Pat. Off. . |
| 0331424A1 | 9/1989 | European Pat. Off. . |
| 0376183A1 | 7/1990 | European Pat. Off. . |
| 0389084A2 | 9/1990 | European Pat. Off. . |

OTHER PUBLICATIONS

J. F. Janik et al, "Baron Nitride as a Selective Gas Adsorbent", Langmuir 1994, vol. 10, pp. 514–518.

T. T. Borek etal, "Highly Microporous Boron Nitride For Gas Adsorption", Langmuir 1991, vol. 7. pp. 2844–2846.

Ceramics from Organometallic Polymers, Peuckert et al, 1990, pp. 398–404.

Pyrolysis Chemistry of Poly(organosilazanes) to Silicon Ceramics, Han et al, Feb. 24, 1992, pp. 705–711.

A method for the determination of the pore size distribution of molecular sieve materials and its application to the characterization of partially pyrolyzed polysilastyrene/porous glass composite membranes, Grosgogeat et al, Nov. 5, 1990, pp. 237–255.

*Primary Examiner*—Karen A. Dean
*Attorney, Agent, or Firm*—Jay Simon

[57] ABSTRACT

The present invention provides for microporous ceramic materials having a surface area in excess of 70 $m^2/gm$ and an open microporous cell structure wherein the micropores have a mean width of less than 20 Angstroms and wherein said microporous structure comprises a volume of greater than about 0.03 $cm^3/gm$ of the ceramic. The invention also provides for a preceramic composite intermediate composition comprising a mixture of a ceramic precursor and finely divided silicon carbide or silicon nitride, whose pyrolysis product in inert atmosphere or in an ammonia atmosphere at temperatures of up to less than about 1100° C. gives rise to the microporous ceramics of the invention. Also provided is a process for the preparation of the microporous ceramics of the invention involving pyrolysis of the ceramic intermediate under controlled conditions of heating up to temperatures of less than 1100° C. to form a microporous ceramic product.

18 Claims, No Drawings

SYNTHESIS OF MICROPOROUS CERAMICS

BACKGROUND OF THE INVENTION

1. Field of the Invention

The present invention relates to open pore, microporous ceramic materials and their method of manufacture.

2. Description of Related Art

Porous materials play a particularly important role in a number of chemical processing industries and applications. Separations based on membranes are critical in such fields as chemical recovery, purification and dehumidification. Porous oxides (e.g., clays, silica, alumina and zeolite) are the materials of choice as catalysts or catalyst supports in chemical and petroleum processing reactions such as hydrocracking, hydrodesulfurization, reforming, and polymerization.

With respect to membrane technology, inorganic membranes offer a number of advantages over polymeric membranes which are typically limited to uses at temperatures below about 250° C. These include: i) higher operating temperatures, ii) greater structural integrity and hence the ability to withstand higher pressure differentials and backflushing, and iii) improved resistance to corrosion. Porous oxide (e.g., aluminum oxide) and carbon membranes offer some of these characteristics, but advanced materials are still required for improved strength, toughness, structural integrity, temperature stability, water and oxygen resistance, thermal shock resistance, molecular selectivity to small molecules and gases, and high flux.

Similar considerations apply to clay and metal oxide type catalysts or catalyst supports, particularly as relates to stability and thermal shock resistance at temperatures above about 500° C.

Ceramic materials of the Si—C, Si—N, Si—C—N, Si—B—C, Si—BN, Al—N, Si—Al—N, B—Al—N and related types appear to offer many of the properties set forth above. However, the solgel synthesis methods typically used to prepare porous oxide membranes or catalyst supports are incompatible with the preparation of ceramics of the type described above because of the need to use water in their preparation. Sintering or reactive sintering of these ceramics likewise produces materials with pore sizes of from about 0.1 to about 1000 microns which are non-uniform and generally too large for effective molecular separation and other uses described above. Chemical vapor deposition can produce microporous ceramic layers, but this tends to be an expensive, high temperature process with limited ability to tailor complex ceramic compositions.

Recently, researchers have discovered improved methods for preparing ceramics using ceramic precursors as starting materials. A ceramic precursor is a material, a chemical compound, oligomer or polymer, which upon pyrolysis in an inert atmosphere and at high temperatures, e.g., above about 200°–400° C., preferably above 700°–1000° C., will undergo cleavage of chemical bonds liberating such species as hydrogen, organic compounds and the like, depending upon the maximum pyrolysis temperature. The resulting decomposition product is typically an amorphous ceramic containing Si—C bonds (silicon carbide), Si—N bonds (silicon nitride) or other bond structures which will vary as a function of the identity of the ceramic precursor, e.g., Si—C—N, Si—N—B, B—N, Al—N and other bond structures, as well as combinations of these structures. Crystallization of these amorphous ceramic products usually requires even higher temperatures in the range of 1200°–1600° C.

The pyrolysis of various ceramic precursors, e.g., polycarbosilanes, polysilanes, polycarbosiloxanes, polysilazanes, and like materials at temperatures of 1200° C. and higher to produce ceramic products, e.g., silicon carbide and/or silicon nitride, is disclosed, for example, in M. Peuckert et al, "Ceramics from Organometallic Polymers", Adv. Mater. 2, 398–404 (1990).

During pyrolysis, preceramic precursors such as described above liberate various gaseous decomposition species such as hydrogen and organic compounds, including methane, higher molecular weight hydrocarbon molecules, and lower molecular weight precursor fragments. These gases tend to coalesce within the preceramic matrix as they form, resulting in a bulking or swelling to form a voluminous mass of low bulk density. These entrained gases can also lead to the formation of smaller gas bubbles within the developing ceramic mass as the preceramic precursor crosslinks and hardens, resulting in a reduced density ceramic having a mesoporous or macroporous closed-cell structure, without development of a significant amount of open celled micropores.

Where dense,. non-porous ceramic materials are sought using ceramic precursors yielding high gas volumes, it is often necessary to conduct the pyrolysis over a very long period of time with very gradual incremental temperature increases and/or under vacuum to assist in removal of these gaseous species at temperatures where they are formed.

SUMMARY OF THE INVENTION

The present invention provides for amorphous, microporous, ceramic materials having a surface area in excess of 70 $m^2$/gm, preferably in excess of 100 $m^2$/gm, and an open-pore microporous cell structure wherein the micropores have a mean width (diameter) of less than 20 Angstroms (Å) and wherein said microporous structure comprises a volume of greater than about 0.03 $cm^3$/gm, preferably greater than 0.05 $cm^3$/gm, of the ceramic. The invention also provides for a preceramic composite intermediate composition comprising a mixture of a ceramic precursor and finely divided silicon carbide and/or silicon nitride, whose pyrolysis product in inert atmosphere or in an ammonia atmosphere at temperatures of up to less than about 1100° C. gives rise to the microporous ceramics of the invention. Also provided is a process for the preparation of the microporous ceramics of the invention comprising: a) forming an intimate mixture comprising from greater than 30 up to about 99 parts by weight of a ceramic precursor oligomer or polymer having a number average molecular weight in the range of from about 200 to about 100,000 g/mole and from about 1 to less than 70 parts by weight of ceramic particles selected from the group consisting of silicon carbide, silicon nitride and mixtures thereof, said particles having a mean particle size of less than about 10 microns, b) gradually heating said mixture in the presence of an inert gas or ammonia gas and in sequential stages with hold times at intermediate temperatures to a maximum temperature in the range of from about 400° C. up to less than about 1100° C. and over a period of total heating and hold time of from about 5 to about 50 hours to form a microporous ceramic product, and c) cooling said microporous ceramic product.

The microporous ceramics prepared in accordance with this invention generally exhibit a surface area within the range of from about 70 to about 400 $m^2$/gm based on the combined weight of amorphous phase and particles, and amorphous phase micropore volumes of greater than 0.03 up to about 0.17 cm³/g, wherein the volume fraction of micropores in the ceramic product ranges from about 8% to about 32%.

Ceramics produced in accordance with this invention are particularly useful in bulk sorbent applications, as active layers in membrane separation structures and as catalyst supports.

DETAILED DESCRIPTION OF THE INVENTION

As used herein, the term microporous ceramic refers to a ceramic having a porous structure wherein the pores have a mean width (diameter) of less than 20 Å. This definition and the physical and chemical adsorption behavior of microporous materials are disclosed in S. J. Gregg and K. S. W. Sing, "Adsorption, Surface Area and Porosity", Academic Press, New York, 1982; and S. Lowell and J. F. Shields, "Powder Surface Area and Porosity", Chapman and Hall, New York, 3rd Edition, 1984. This term is to be contrasted with the term "mesoporous" which refers to pores having a mean width of greater than 20 Å up to about 500 Å, and the term "macroporous", which refers to pores having a mean width greater than about 500 Å. More specifically, the term microporous refers to such structures wherein essentially all of the pores have a width of from about 2 to about 20 Å. The surface area and micropore volume are calculated from the nitrogen adsorption isotherm, which is measured at 77° K. using an automated continuous flow apparatus. The total surface area is calculated using the BET method, and the micropore volume and mesopore/macropore surface area are calculated using the T-plot method, as described in the Gregg reference above. Subtraction of the mesopore/macropore surface area from the total surface area gives an estimate of the micropore surface area.

Ceramic precursor materials which are preferred for the purposes of this invention include oligomers and polymers such as polysilazanes, polycarbosilazanes, perhydro polysilazanes, polycarbosilanes, vinylicpolysilanes, amine boranes, polyphenylborazanes, carboranesiloxanes, polysilastyrenes, polytitanocarbosilanes, alumanes, polyalazanes and like materials, as well as mixtures thereof, whose pyrolysis products yield ceramic compositions containing structural units having bond linkages selected from Si—C, Si—N, Si—C—N, Si—B, Si—B—N, Si—B—C, Si—C—B, Si—C—N—B, Si—Al—N—C, Si—Al—N, Al—N, B—N, B—N—C and Al—N—B, as well as oxycarbide and oxynitride bond linkages such as Si—O—N, Si—Al—O—N and Ti—O—C. The preferred precursors are those oligomers and polymers having a number average molecular weight in the range of from about 200 to about 100,000 g/mole, more preferably from about 400 to about 20,000 g/mole. The chemistry of these oligomeric and polymeric precursors are further disclosed in the monograph "Inorganic Polymers", J. E. Mark, H. R. Allcock, and R. West, Prentice Hall, 1992.

Particularly preferred polysilazanes are those materials disclosed in U.S. Pat. Nos. 4,937,304 and 4,950,381, the complete disclosures of which are incorporated herein by reference. These materials contain, for example, recurring —Si(H)(CH₃)—NH— and —Si(CH₃)₂—NH— units and are prepared by reacting one or a mixture of monomers having the formula $R_1SiHX_2$ and $R_2R_3SiX_2$ in anhydrous solvent with ammonia. In the above formulas, $R_1$, $R_2$ and $R_3$ may be the same or different groups selected from hydrocarbyl, alkyl silyl or alkylamino and $X_2$ is halogen.

The preferred polysilazanes are prepared using methyldichlorosilane or a mixture of methyldichorosilane and dimethyldichlorosilane as monomer reactants with ammonia. The primary high temperature pyrolysis product (>1300° C.) of this precursor are silicon nitride ($Si_3N_4$) and silicon carbide (SIC). These precursors are commercially available from Chisso Corporation, Japan under the trade designations NCP-100 and NCP-200, and have a number average molecular weight of about 6300 and 1300 respectively.

Another class of polysilazane precursors are polyorgano (hydro) silazanes having units of the structure

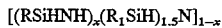

where $R_1$ is the same or different hydrocarbyl, alkylsilyl, alkylamino or alkoxy and $0.4<X<1$. These materials are disclosed in U.S. Pat. No. 4,659,850, the complete disclosure of which is incorporated herein by reference.

Another preferred ceramic precursor is a polysilastyrene having the structure $[-(phenyl)(methyl)Si-Si(methyl)_2-]_n$ available under the trade designation "Polysilastyrene-120" from Nippon Soda, Japan. This material has a number average molecular weight of about 2000 and the primary pyrolysis product is silicon carbide.

Other preferred ceramic precursors are polycarbosilanes having units of the structure $[-Si(CH_3)_2-CH_2-]_n$ and/or $[-Si(H)(CH_3)-CH_2-]_n$ having a number average molecular weight in the range of about 1000 to 7000. Suitable polycarbosilanes are available from Dow Corning under the trade designation PC-X9-6348 (Mn=1420 g/mol) and from Nippon Carbon of Japan under the trade designation PC-X9-6348 (Mn=1420 g/mol). The main pyrolysis product of these materials in an inert atmosphere are silicon carbide and excess carbon.

Vinylic polysilanes useful in this invention are available from Union Carbide Corporation under the trade designation Y-12044. These yield silicon carbide together with excess carbon as the main pyrolysis product.

Suitable polyalazane (alumane) preceramic precursors are those having recurring units of the structure R—Al—N—R', where R and R' are the same or different hydrocarbyl groups (particularly $C_1$–$C_4$alkyl), and are described in an article "Polymer Precursors For Aluminum Nitride Ceramics", J. A. Jensen, pp. 845–850, in "Better Ceramics Through Chemistry", MRS Symposium Proceedings, Vol. 271. The main pyrolysis product of these materials is aluminum nitride.

Other suitable preceramic precursors will be evident to those skilled in the art, particularly those yielding amorphous and crystalline phases such as SiC, $Si_3N_4$, Si—C—N, B—N, Si—B—N, $B_4C$—BN—C, Si—B—C, Si—Al—N, B—Al—N and Al—N pyrolysis products.

The solid particulate material which is mixed with the ceramic precursor material may be in the form a powder having a mean particle size of less than 10 microns or in the form of finely chopped fibers less than 1 mm long and having a mean diameter of less than 10 microns. Compositionally, these particles consist essentially of crystalline silicon carbide, crystalline silicon nitride and mixtures thereof, as well as amorphous phase forms of silicon-carbide-nitride which may contain Si—C, Si—C—N and Si—C—C bond structures. The crystalline materials are commercial materials available as very fine powders or fibers. The amorphous materials are prepared by thermal decomposition of the appropriate precursor polymer(s) at temperatures of less than 1300° C., followed by comminution to the required particle size.

The surface area and the degree of microporosity which can be achieved in the microporous ceramics prepared in accordance with this invention has been found to vary inversely with the mean particle size or mean diameter of the ceramic particles which are blended with the ceramic precursor to form the composite intermediate. Where the mean particle size or diameter is large, i.e., 20 microns or greater, the particles tend to settle within the preceramic matrix giving rise to two distinct phases, i.e., a dense phase and a voluminous non-microporous phase containing high and low concentrations of particles respectively. Preferably the ceramic particles will have a mean particle size or diameter of less than 10 microns, preferably less than 5 microns and more preferably from about 0.1 to about 2 microns. Commercially available ceramic powders of larger particle size can be ground by any suitable means, including cryogenic grinding below minus 100° C., to achieve non-aggregate, mean particle sizes within these preferred ranges.

Although the factors underlying the development of the microporous, open-celled ceramic structure achieved in accordance with this invention are not completely understood, it is believed that the individual solid particulates dispersed within the molten or glassy preceramic polymer matrix serve to prevent nucleation of large bubbles of decomposition gases which form within the matrix as the temperature increases. The decomposition gases thus more readily escape from the matrix by diffusion, thereby avoiding the development of a voluminous swelling of the ceramic mass. The elimination of molecular species from the ceramic precursor molecules, accompanied by crosslinking, provides a templating effect which thus entrains a significant volume of microporosity and contributes to enhanced surface area of the resulting, solidified ceramic mass.

Another factor which has been found to influence both the total surface area and degree of microporosity achieved in the pyrolyzed ceramic of this invention is the amount of ceramic precursor mixed with the ceramic particles to form the composite intermediate. This level will vary within the range of from greater than 30 parts by weight up to about 99 parts by weight of ceramic precursor and correspondingly from about 1 to less than 70 parts by weight of the ceramic particles. Microporous ceramics having a post-pyrolysis surface area in excess of about 150 m$^2$/gm and a micropore volume in excess of 0.05 cm$^3$/gm can be achieved when the amount of ceramic precursor mixed with the ceramic particles to form the composite intermediate is in excess of 50 parts by weight up to about 80 parts by weight precursor and the balance to 100 parts by weight of ceramic particles. The most preferred range is from about 52 to about 70 parts by weight ceramic precursor per corresponding about 30 to about 48 parts by weight of ceramic particles, since composite intermediates containing this latter ratio of components can yield post-pyrolysis surface areas of greater than 200 m$^2$/gm and micropore volumes of greater than 0.08 cm$^3$/gm.

The microporous ceramic compositions of this invention are prepared by first forming an intimate mixture of the ceramic precursor and the ceramic particles to provide a composite intermediate, followed by pyrolysis of the composite intermediate under an inert atmosphere or ammonia in sequential stages with hold times at intermediate temperatures to a final temperature in the range of from about 400° C. to less than 1100° C.

The composite intermediate mixture may be formed by any suitable process which will provide for a uniform dispersion of the ceramic particles within the ceramic precursor matrix. Thus, the components may be ground, ball milled or pulverized together in dry form, or the components may be slurry blended by forming a very fine suspension of the ceramic particles in an organic liquid which is a solvent for the ceramic precursor, dissolving the precursor in the solvent to form a slurry and evaporating the solvent at temperatures of 30° C. to 80° C. at atmospheric pressure or under vacuum to obtain a composite intermediate composed of the preceramic precursor having the ceramic particles uniformly dispersed therein. The composite may then be comminuted to provide a particulate molding powder.

Suitable solvents for the solution blending process include aromatic and aliphatic hydrocarbons such as benzene, toluene, and hexane, as well as ethers such as tetrahydrofuran, diethyl ether and dimethyl ether. Where the slurry blending technique is used, the ceramic precursor and ceramic particles are preferably added to the solvent at a combined weight ratio within the range of from about 20 to 50% by weight solids. Ultrasonic mixing techniques and/or a suitable dispersant can be used to facilitate the formation of a very fine suspension of the ceramic particles in the organic solvent.

Prior to pyrolysis, the composite intermediate may be formed into any desired shape such as a pellet, disc, fiber, thin membrane or other three dimensional shape. The dry composite may be shaped using an extruder or a hydraulic press, with or without heat being applied, or by conducting the pyrolysis in a suitable mold cavity containing the composite intermediate. Fibers may be prepared by extruding or spinning a melt or a solvent slurry of the composite intermediate, while thin separation membranes may be formed by applying a melt or solvent slurry of the composite intermediate to the surface of a suitable substrate, such as another ceramic, and subjecting the structure to well known spin or whirl coating techniques to form a uniform, thin coating of the composite intermediate on the surface of the substrate, followed by heating to evaporate off the solvent where solvent is present.

As indicated above, pyrolysis of the composite intermediate is next conducted by heating it under inert flowing gas, e.g., argon, helium or nitrogen, or under flowing ammonia gas, at a controlled rate of temperature, with preferred hold times at intermediate temperatures to maintain uniformity of the ceramic product, and a final hold time at the maximum heating temperature, followed by gradual cooling of the ceramic end product to room temperature. The heating rate may range from about 0.5° to 10° C. per minute, more preferably from about 0.5° to 6° C. per minute and most preferably from about 0.5° to less than 3° C. per minute. Generally speaking, microporous ceramics are formed by gradually heating the composite intermediate to a maximum temperature ($T_{max}$) in the range of from about 400° C. to less than about 1100° C. at a heating rate in the range of from about 30° C. to 400° C. per hour, with various holding times of about 0.5 to about 5 hours at selected temperatures between about 200° C. and $T_{max}$. Total combined heating/holding time may range from about 5 to about 50 hours, more preferably from about 8 to about 24 hours. Holding times and temperatures are dictated by ceramic precursor decomposition and reaction kinetics. Hence they depend on precursor composition and the rate of evolution of specific molecular species at or about the holding temperature, e.g., $H_2$, $CH_4$, higher molecular weight hydrocarbon or H—C—N species or ceramic precursor fragments, as reflected by sample weight losses at or about these temperatures. The flow rate of the inert gas or ammonia gas may range from about 100 to about 1000 cc/min.

In the more preferred embodiment of the invention, pyrolysis is carried out in a heat treating furnace or muffle oven using the following schedule and using flowing inert gas or ammonia throughout:

i) after flushing the furnace with inert gas, e.g., helium, the temperature is first increased to about 200°±25° C. over a period of 0.5–3 hours, held at that temperature for a period of 0.5–5 hours, preferably 1–2 hours and the temperature then increased;

ii) in the second step, the temperature is increased to about 300°±25° C. over a time of from about 0.5 to 5 hours, preferably from 1–2 hours and held at that temperature for 0.5–5 hours, preferably 1–2 hours, and the temperature again increased;

iii) in the third step the temperature is increased to $T_{max}$ or about 500°±25° C. whichever is less, over a time period up to about 5 hours, preferably up to 2 hours, and held at that temperature for 0.5–5 hours, preferably 1–2 hours;

iv) in a fourth step where $T_{max}$ is above 500° C., the temperature is increased to $T_{max}$ or about 700°±25° C., whichever is less, over a time period up to about 5 hours, preferably up to 2 hours, and held at that temperature for 0.5–5 hours, preferably 1–2 hours;

v) in a subsequent step where $T_{max}$ ranges between 700° C. and 1100° C., the temperature is increased to $T_{max}$ over a time period of up to 5 hours, preferably 1–3 hours, and held at $T_{max}$ for 0.5–5, preferably 1–2 hours.

In the most preferred embodiment of the invention, the composite intermediate is heated as above with a 1–2 hour hold at about 200° C., 300° C., 500° C. and 700° C. (and $T_{max}$ if $T_{max}$ is greater than 700° C.), and the pyrolyzed ceramic then allowed to return from $T_{max}$ to room temperature while continuing the flow of inert gas or ammonia during the cooling period.

In addition to particle size and quantity of ceramic particles present in the composite intermediate, another factor which influences both surface area and the degree of microporosity which can be achieved in the microporous ceramic is the final temperature to which the ceramic is heated. It has been found with respect to most composite intermediates pyrolyzed under inert or ammonia gas that the surface area and degree of microporosity tends to diminish as $T_{max}$ approaches 1100° C., and tends to be at maximum levels at $T_{max}$ of up to about 700° C.±150° C. For these reasons, a more preferred heating schedule is such that $T_{max}$ ranges from about 500° C. to about 850° C., more preferably from about 550° C. to about 750° C.

The following examples are illustrative of the invention. As used in the examples and tables, the following designations have the following meanings:

NCP-100—A polysilazane polymer available from the Chisso Corporation of Japan having a number average molecular weight of about 6300 g/mole and a melting point of about 200° C.

NCP-200—A polysilazane polymer available from the Chisso Corporation of Japan having a number average molecular weight of about 1300 g/mole and a melting point of about 100° C.

PCS—A polycarbosilane preceramic polymer available from Nippon Carbon Company of Japan (U.S. distribution Dow Chemical Company) having a number average molecular weight of about 2000 g/mole and a melting point of about 100° C.

PSS—A polysilastyrene preceramic polymer available from Nippon Soda Corporation of Japan having a number average molecular weight of about 2000 g/mole and a melting pointing of about 200° C.

EXAMPLE 1 (D6B)

A mixture of 3 grams of NCP-200 polysilazane polymer was prepared by grinding it in an agate mortar and pestle with 2 grams of SiC of particle size ≧ about 7 microns available from Cerac Corporation under the designation S-1058. After grinding for complete mixing, 5 gm of the mixture was placed in an aluminum oxide boat and inserted in the steel liner of a heat treating furnace, and purged with flowing He at a flow rate of 300 cc/minute for about 30 minutes. The furnace was then heated under He at a flow rate of 300 cc/minute to 200° C. in 35 minutes, held at 200° C. for 60 minutes, heated to 300° C. in 129 minutes, held 300° C. for 120 minutes, heated to 500° C. in 120 minutes, held at 500° C. for 132 minutes, heated to 700° C. in 120 minutes, and held at 700° C. for 60 minutes. Thereafter, the furnace was turned off and the sample was allowed to cool to room temperature over a period of about 480 minutes. The resulting product was a compact material with a weight of 3.9 gm. The sample exhibited a Type 1 nitrogen adsorption isotherm, and had a surface area of 195 $m^2$/gm and a micropore volume of 0.0780 $cm^3$/gm.

EXAMPLE 2 (D6C)

A mixture of 3 grams of NCP-200 polysilazane polymer was prepared with 2 grams of SiC of particle size ≧ about 7 microns, in a two-step process. First, the two materials were mixed and ground in an agate mortar and pestle. Then the mixture was pressed into a pellet of diameter about 1.3 cm in a hydraulic press, at a pressure of about 4,000 lb/sq-inch. Then the pellet was placed in the steel liner of a heat treating furnace and heated according to the schedule described in Example 1. The sample exhibited a Type 1 nitrogen adsorption isotherm, and had a surface area of 172 $m^2$/gm and a micropore volume of 0.0700 $cm^3$/gm.

EXAMPLE 3 (D6A)

A mixture of 3 grams of NCP-200 polysilazane polymer was prepared with 2 grams of SiC of particle size ≧ about 7 microns, in a two-step process. The two materials were mixed and then added to about 15 cc of toluene in a glass beaker. The polysilazane dissolved, and upon stirring a slurry was formed with the SiC. Next the toluene was evaporated on a hot plate. The integrally mixed sample of polysilazane polymer and SiC powder was then placed in an aluminum oxide boat, and inserted into a steel heat treating furnace. The sample was then heated using the schedule described in Example 1. The sample exhibited a Type 1 nitrogen adsorption isotherm, and had a surface area of 191 $m^2$/gm and a micropore volume of 0.0730 $cm^3$/gm.

EXAMPLE 4 (D7A)

A sample was prepared in the manner of Example 3, except that NCP-100 polysilazane polymer was substituted for NCP200. After heating to 700° C., the resulting product sample exhibited a Type 1 nitrogen adsorption isotherm, and had a surface area of 174 $m^2$/gm and a micropore volume of 0.0710 $cm^3$/gm.

EXAMPLE 5 (D17-7)

A mixture of 1.8 gm of NCP-200 polysilazane with 1.2 gm of SiC of ≧ about 7-micron particle size was made using the initial grinding procedure of Example 1. Then the mixture was placed in a 40 cc polystyrene jar together with 0.6 cm alumina balls and mixed on a rolling mill for 48 hours. The resulting material was then heated in He as described in Example 1, with the final temperature 718° C. The resulting product sample exhibited a Type 1 nitrogen absorption isotherm, and had a surface area of 279 $m^2$/gm and a micropore volume of 0.1069 $cm^3$/gm.

EXAMPLE 6 (D17-1)

A polysilazane-SiC sample was prepared as described in Example 5, but using a SiC powder of about 1-micron particle size available from Johnson Mathey, Inc. under the trade designation SiC. The resulting product sample exhibited a Type 1 nitrogen adsorption isotherm, and had a surface area of 260 $m^2$/gm and a micropore volume of 0.1000 $cm^3$/gm.

EXAMPLE 7 (D17-3)

A polysilazane-ceramic mixture was prepared and heated in the manner described in Example 6, using a $Si_3N_4$ powder available from Denki KKKK of Japan under the designation SN-9S having a particle size range of 1 to 5-micron. The resulting product sample exhibited a Type 1 nitrogen adsorption isotherm, and had a surface area of 265 $m^2$/gm and a micropore volume of 0.1024 $cm^3$/gm.

EXAMPLE 8 (D17-8)

Using a $Si_3N_4$ powder of particle size range of <1 micron (available from Denki KKKK of Japan under the designation SN-G2), a suspension of 1.2 gm of $Si_3N_4$ in 5 ml of toluene was formed in a beaker, and the suspension was treated ultrasonically for 60 minutes until it appeared well dispersed. To this solution was then added 1.8 gm of NCP200 polysilazane, using an additional 2 ml of toluene to wash down the sides of the beaker. The toluene was evaporated over 4 days in an oven at 60° C. The dried mixture was then heated in flowing He to 700° C. in the manner described in Example 6. The resulting product sample exhibited a Type 1 nitrogen absorption isotherm, and had a surface area of 313 $m^2$/gm and a micropore volume of 0.1230 $cm^3$/gm.

EXAMPLE 9 (D17-2)

A polysilazane-ceramic mixture was prepared and heated in the manner described in Example 5, but using a $Si_3N_4$ powder of particle size range ≤1-micron available from Denki KKKK of Japan under the designation SN-G2. The resulting product sample exhibited a Type 1 nitrogen absorption isotherm, and had a surface area of 300 $m^2$/gm and a micropore volume of 0.1164 $cm^3$/gm.

The following examples demonstrate the use of an amorphous (glassy) Si—C—N ceramic powder in the preparation of the microporous ceramics of this invention.

EXAMPLE 10 (D35-1)

A 9 gram sample of NCP-100 polysilazane was heated in flowing He to 700° C. following the heating schedule of Example 1, and cooled to room temperature in 480 minutes. The heat-treated sample, which was a voluminous amorphous ceramic product, was taken from the furnace and placed in a vacuum desiccator. Then it was crushed in a Spec cryogenic mill using liquid nitrogen treatment and cryogenic crushing. The SEM examination of the sample after crushing revealed that the sample had many agglomerates, but that 90% of the particles in the sample were <1-micron.

Next, 1.2 grams of this ground sample was added to 1.8 gm of NCP-200 polysilazane which had been ground in a mortar and pestal. This mixture was placed in a plastic 40 cc polystyrene jar together with 0.6 cm alumina balls and mixed on a rolling mill for 2 hours. This sample was then heated to 700° C. in flowing He according to the following time-temperature sequence. After 30 minutes flushing with He at room temperature, the temperature was raised to 200° C. in 60 minutes and held at 200° C. for 240 minutes. Then it was raised to 300° C. in 120 minutes and held at 300° C. for 300 minutes, and then raised to 400° C. in 120 minutes. After holding at 400° C. for 300 minutes, the temperature was raised to 600° C. in 120 minutes, held at 600° C. for 120 minutes, raised to 700° C. in 120 minutes, held at 700° C. for 120 minutes, then cooled to room temperature in 480 minutes. The resulting product sample exhibited a Type 1 nitrogen adsorption isotherm, and had a surface area of 263 $m^2$/gm and a micropore volume of 0.1053 $cm^3$/gm.

EXAMPLE 11

Example 10 was repeated as set forth therein, except that the amorphous Si—C—N powder used was ground to an average particle size of about 10 microns. The resulting product exhibited a surface area of 138 $m^2$/gm.

EXAMPLE 12

Example 10 was repeated as set forth therein, except that the amorphous Si—C—N powder used was ground to an average particle size of about 50 microns. The resulting product had a surface area of 7 $m^2$/gm, and was essentially nonmicroporous.

Comparison of the surface areas of the products produced in Examples 10–12 shows the effect of particle size of the added ceramic powder with respect to the surface area of the ceramic product.

EXAMPLE 13 (D-3)—Control

A sample of 3 gm of NCP-200 polysilazane was ground in a mortar and pestle and heated by itself in an alumina crucible using the heating schedule described in Example 3. After heating to 700° C., the resulting product sample exhibited a very low surface area (<1 $m^2$/gm), with no microporosity observed in the nitrogen adsorption and no micropore volume.

EXAMPLE 14 (D35-2)—Control

A sample of 3 gm of NCP-100 polysilazane was ground in a mortar and pestle and heated by itself in an aluminum crucible using the heating schedule described in Example 3. After heating to 700° C., the resulting product sample exhibited a very low surface area (<1 $m^2$/gm), with no microporosity observed in the nitrogen adsorption.

EXAMPLE 15 (D35-5)—Control

Example 14 was repeated except that PSS polysilastyrene was substituted for NCP-100 polysilazane. After heating to 700° C., the resulting product exhibited a surface area of less than 1 $m^2$/gm with no observable microporosity.

EXAMPLE 16 (D36-1)—Control

Example 14 was repeated except that PCS polycarbosilane was substituted for NCP-100 polysilazane. After heating to 700° C., the resulting product exhibited a surface area of less than 1 $m^2$/gm with no observable microporosity.

Control Examples 13–16 demonstrate that heating the various ceramic precursors without added ceramic powder in inert helium gas does not provide ceramic products having the microporous structure which is the subject matter of this invention.

EXAMPLE 17

A series of samples described in Table 1 were prepared as follows. A mixture of 1.8 gm of preceramic polymer (PCP)

was made with 1.2 gm of SiC. The preceramic polymer was either a polysilazane of MW 1300 or a polycarbosilane of MW 2000, and the SiC particle size was either about 7 micron or about 1 micron as indicated in Table 1. Then the mixture was placed in a plastic jar together with 0.6 cm alumina balls and mixed on a rolling mill for 48 hours. The resulting material was then heated in He as described in Example 1, with the final temperature about 700° C., followed by 480 minute cool to room temperature.

TABLE 1

SERIES OF SAMPLES WITH VARYING PCP/SiC RATIO
(PCP = Preceramic Polymer)

| Sample Number | SiC Particle Size (micron) | Wt % PCP in SiC-PCP Mixture | Surface Area (m²/gm) | Micropore Volume (cm³/gm) |
|---|---|---|---|---|
| D16-7A | 7 | 20* | 116 | 0.0450 |
| D16-6 | 7 | 30* | 162 | 0.0661 |
| D18-13 | 1 | 35** | 234 | 0.0936 |
| D16-8 | 7 | 40* | 206 | 0.0805 |
| D12-2 | 7 | 50* | 206 | 0.0826 |
| D17-7 | 7 | 60* | 279 | 0.1069 |
| D8-4 | 1 | 60* | 303 | 0.1200 |
| D18-6 | 1 | 60** | 155 | 0.0614 |
| D18-10 | 1 | 75** | 164 | 0.0615 |
| D10-3 | 7 | 80* | 124 | 0.0493 |
| D10-2 | 7 | 85* | 126 | 0.0500 |
| D11-11 | 1 | 85* | 115 | 0.0458 |
| D10-1 | 7 | 90* | 76 | 0.0301 |
| D9-8 | 7 | 95* | 13 | 0.0050 |

*NCP-200 polysilazane
**PCS polycarbosilane

The data in Table 1 demonstrates the effect of the level of SiC present in the composite intermediate with respect to surface area and micropore volume of the pyrolyzed ceramic.

EXAMPLE 18—Effect of Temperature of PCP/SiC Mixtures

A series of samples described in Table 2 were prepared as follows. A mixture of 1.8 gm of preceramic polymer (PCP) was made with 1.2 gm of SiC. The preceramic polymer was either a polysilazane of molecular weight about 1300 or 6300 or a polycarbosilane of MW 2000, and the SiC particle size was either about 7 micron or 1 micron as indicated in Table 2. Then the mixture was placed in a 40 cc polystyrene jar together with 0.6 cm alumina balls and mixed on a rolling mill for 48 hours. The resulting material was then heated in He as to a final temperature of 500° C., 600° C., 700° C., 850° C. or 1000° C. The general temperature-time sequence used is as follows: Purge with He at a flow rate of 300 cc/min for 30 minutes. Heat in 60 minutes to 200° C., followed by a hold for 300 minutes at that temperature. Next, heat to 400° C. in 120 minutes, followed by a hold for 300 minutes at that temperature. Then heat in 120 minutes to 500° C. If this is the final temperature, maintain at 500° C. for 120 minutes, followed by a cool to room temperature. For 700° C. run schedule, heat from 500° C. to 700° C. in 120 minutes, and hold for 120 minutes before cooling to room temperature. For 850° C. run schedule, heat from 700° C. to 850° C. in 120 minutes, and hold for 120 minutes before cooling to room temperature. For 1000° C. run, heat from 850° C. to 1000° C. in 120 minutes and hold at that temperature for 120 minutes before cooling to room temperature in 480 minutes.

TABLE 2

Series of Samples With Varying Temperature and PCP, with SiC
(60 wt % PCP-40 wt % SiC; PCP = Preceramic Polymer)

| Sample Number | SiC Particle Size, μm | PCP | Surface Area (m2/gm) | Micropore Volume (cm3/gm) | Maximum Temperature (°C.) |
|---|---|---|---|---|---|
| D19-3 | 1 | NCP-200 | 300 | 0.1106 | 500 |
| D19-2 | 1 | NCP-100 | 295 | 0.1095 | 500 |
| D13-1 | 7 | NCP-200 | 280 | 0.1058 | 600 |
| D20-1 | 1 | NCP-200 | 215 | 0.0803 | 600 |
| D20-3 | 1 | NCP-100 | 150 | 0.0516 | 600 |
| D24-4 | 1 | PCS | 340 | 0.1278 | 600 |
| D17-7 | 7 | NCP-200 | 279 | 0.1069 | 700 |
| D8-4 | 1 | NCP-200 | 303 | 0.1200 | 700 |
| D12-7 | 7 | NCP200/100 | 176 | 0.0677 | 700 |
| D18-6 | 1 | PCS | 155 | 0.0614 | 700 |
| D21-1 | 1 | NCP-200 | 114 | 0.0404 | 850 |
| D26-4 | 1 | PCS | 177 | 0.0702 | 850 |
| D22-1 | 1 | NCP-200 | 163 | 0.0612 | 1000 |
| D22-3 | 1 | NCP-100 | 121 | 0.0466 | 1000 |

EXAMPLE 19—Effect of Temperature for PCP/Si$_3$N$_4$ Mixtures

A series of samples described in Table 3 were prepared as follows. A mixture of 1.8 gm of preceramic polymer (PCP) was made with 1.2 gm of Si$_3$N$_4$ having a particle size either 40 micron, 1–5 micron or <1 micron as indicated in Table 3. Then the mixture was placed in a 40 cc polystyrene jar together with 0.6 cm alumina balls and mixed on a rolling mill for 48 hours. The resulting material was then heated in He to a final temperature of 500° C., 600° C., 700° C., 850° C. or 1000° C. The general temperature-time sequence used is that of Example 18.

TABLE 3

Series of Samples With Varying Temperature and PCP, with Si$_3$N$_4$ (60 wt % PCP-40 wt % Si$_3$N$_4$; PCP = Preceramic Polymer)

| Sample Number | Si$_3$N$_4$ Particle Size (micron) | PCP | Surface Area (m²/gm) | Micropore Volume (cm³/gm) | Maximum Temperature (°C.) |
|---|---|---|---|---|---|
| D19-2 | <1 | NCP-200 | 295 | 0.1095 | 500 |
| D19-4 | <1 | NCP-100 | 322 | 0.1196 | 500 |
| D24-5 | <1 | PCS | 350 | 0.1319 | 600 |
| D16-1 | <40 | NCP-200 | 183 | 0.0691 | 700 |
| D17-3 | 1–5 | NCP-200 | 265 | 0.1024 | 700 |
| D17-2 | <1 | NCP-200 | 300 | 0.1164 | 700 |
| D27-2 | <1 | PSS | 277 | 0.1053 | 700 |
| D17-6 | 1–5 | NCP-100 | 225 | 0.0844 | 700 |
| D34-2 | <1 | NCP-100 | 288 | 0.1169 | 700 |
| D26-5 | <1 | PCP | 194 | 0.0763 | 850 |
| D21-2 | <1 | NCP-200 | 258 | 0.1019 | 850 |
| D21-4 | <1 | NCP-100 | 231 | 0.0890 | 850 |
| D22-2 | <1 | NCP-200 | 186 | 0.0678 | 1000 |
| D22-4 | <1 | NCP-100 | 163 | 0.0618 | 1000 |
| D25-5 | <1 | PCS | 176 | 0.0614 | 1000 |

The data in Tables 2 and 3 tend to show that the surface area and maximum micropore volume present in the ceramic tends to vary inversely as a function of higher pyrolysis temperatures.

EXAMPLE 20—Effect of Heating to 1300° C. for PCP/2nd Phase Mixtures

A series of samples described in Table 4 were prepared as follows. A mixture of 1.8 gm of preceramic polymer (PCP)

was made with 1.2 gm of SiN or SiC to provide a 60/40 mixture. Then the mixture was placed in a 40 cc polystyrene jar together with 0.6 cm alumina balls and mixed on a rolling mill for 48 hours. The resulting material was then heated in flowing He to a final temperature of 1300° C. The schedule from room temperature to 1000° C. was similar to that previously described in Example 18. The heating from 1000° C. to 1300° C. was done in 120 minutes, with a hold at 1300° C. for 60 minutes, followed by cooling to room temperature in 480 minutes. It can be seen from the micropore volumes in Table 4 that the microporosity obtained by heating all the way to 1300° C. is quite small. The relatively high surface areas are the surface areas of fine particles, as evidenced by the fact that Type 1 isotherms were not obtained.

TABLE 4

Series of Samples Heated to 1300° C.

| Sample Number | PCP | 2nd Phase | $T_{max}$ (°C.) | Micropore Volume ($cm^3$/gm) | Surface Area ($m^2$/gm) |
| --- | --- | --- | --- | --- | --- |
| D33-1 | NCP-200 | <1 μSi$_3$N$_4$ | 1300 | 0.0015 | 138 |
| D33-2 | NCP-200 | 1 μSiC | 1300 | 0.0007 | 128 |

EXAMPLE 21—Microporosity of Thermally Decomposed PCP/2nd Phase Mixtures Pyrolyzed in Ammonia Gas A series of samples described in Table 5 were prepared as follows. A mixture of 1.8 gm of preceramic polymer (PCP) was made with 1.2 gm of the second phase, using <1 micron Si$_3$N$_4$ powder as the second phase. The mixture was placed in a 40 cc polystyrene jar together with 0.6 cm alumina balls and mixed on a rolling mill for 48 hours. The resulting material was then heated in flowing ammonia at 300 cc/min to a maximum temperature of 700° C. according to heating schedule described in Example 18.

TABLE 5

Thermal Decomposition in Ammonia Gas

| Sample Number | 2nd Phase | PCP | Surface Area ($m^2$/gm) | Micropore Volume ($cm^3$/gm) | Maximum Temp. (°C.) |
| --- | --- | --- | --- | --- | --- |
| D30-1 | <1 μSi$_3$N$_4$ | NCP-200 | 360 | 0.1464 | 700 |
| D32-1 | <1 μSi$_3$N$_4$ | PCS | 387 | 0.1582 | 700 |
| D32-2 | <1 μSi$_3$N$_4$ | PSS | 306 | 0.1123 | 700 |
| D38-1 | <1 μSi$_3$N$_4$ | PCS | 360 | 0.1490 | 700 |
| D39-2 | <1 μSi$_3$N$_4$ | NCP-200 | 308 | 0.1289 | 700 |
| D39-5 | <1 μSi$_3$N$_4$ | NCP-100 | 262 | 0.1079 | 700 |
| D39-8 | <1 μSi$_3$N$_4$ | PSS | 259 | 0.1080 | 700 |

EXAMPLE 22—Representative Hexane Absorption Data on Microporous Non-Oxide Ceramics Prepared From Heating 60 wt % NCP-200/40% 2nd Phase Mixtures To measure the capability of the microporous materials of this invention as sorbents, samples were exposed to hexane at ambient temperature and the weight of hexane absorbed was then determined as a function of relative pressure, P/P$_o$. Plots of weight absorbed as a function of increasing P/P$_o$ exhibited Type I adsorption behavior analogous to that of the same samples in N$_2$ adsorption measurement tests. Representative hexane absorption data for Sample 17-7 (SiC as 2nd Phase) of Table 2 and for samples 17-2 and 22-2 (Si$_3$N$_4$ as 2nd Phase) of Table 3 are shown in Table 6. The effective micropore volume is calculated from the amount of absorption and the liquid density of hexane (0.66 gm/cm$^3$).

TABLE 6

Representative Hexane Absorption Data On Microporous Non-Oxide Ceramics

| Sample | Maximum Pyrolysis Temperature (°C.) | Hexane Absorption In Weight Percent | | Effective Micropore Volume ($cm^3$/gm) |
| --- | --- | --- | --- | --- |
| | | (at P/P$_o$ = 0.5) | (at P/P$_o$ = 0.95) | |
| 17-2 | 700 | 4.5 | 4.7 | 0.0712 |
| 22-2 | 1000 | 3.9 | 4.1 | 0.0621 |
| 17-7 | 700 | 5.0 | 5.2 | 0.0789 |

What is claimed is:

1. A process for preparing a microporous ceramic product having a surface area in excess of 70 m$^2$/gm and a volume of open-pore micropores having a mean diameter of less than 20 Angstroms, and a volume of greater than about 0.03 cm$^3$/gm, comprising:

a. forming an intimate mixture comprising from greater than 30 up to about 99 parts by weight of a ceramic precursor oligomer or polymer having a number average molecular weight in the range of from about 200 to about 100,000 g/mole and from about 1 to less than 70 parts by weight of ceramic particles selected from the group consisting of silicon carbide, silicon nitride, silicon-carbide-nitride and mixtures thereof, said particles having a mean particle size or mean diameter of less than about 10 microns;

b. gradually heating said mixture in the presence of an inert gas or ammonia gas and in sequential stages with hold times at intermediate temperatures to a maximum temperature in the range of from about 400° C. up to less than 1100° C. and over a period of total combined heating and hold time of from about 5 to about 50 hours to form a microporous ceramic product; and c. cooling said microporous ceramic product.

2. The process of claim 1 wherein said ceramic precursor is selected from the group consisting of polysilazanes, polycarbosilazanes, perhydropolysilizanes, polycarbosilanes, vinylic polysilanes, amine boranes, polyphenylborazanes, carboranesiloxanes, polysilastyrenes, polytitanocarbosilanes, polyalazanes and mixtures thereof.

3. The process of claim 2 wherein said ceramic precursor is a polysilazane.

4. The process of claim 1 wherein said mixture contains from about 52 to about 70 parts by weight of said ceramic precursor and from about 30 to about 48 parts by weight of said ceramic particles.

5. The process of claim 1 wherein said microporous ceramic product has a surface area in excess of 100 m$^2$/gm and a micropore volume of greater than 0.05 cm$^3$/gm.

6. The process of claim 1 wherein said microporous ceramic product has a surface area in excess of about 150 m$^2$/gm.

7. The process of claim 1 wherein said microporous ceramic product has a surface area in excess of about 200 m$^2$/gm and a micropore volume of greater than 0.08 cm$^3$/gm.

8. The process of claim 1 wherein said mixture is heated to a maximum temperature in the range of from about 500° C. to about 850° C.

9. The process of claim 8 wherein said mixture is heated to a maximum temperature in the range of from about 550° C. to about 750° C.

10. The process of claim 1 wherein said gas is an inert gas selected from the group consisting of nitrogen, argon and helium.

11. The process of claim 1 wherein said gas is ammonia.

12. The process of claim 1 wherein said heating step includes a holding step of a period of from about 0.5 to 5 hours at approximately 200°±25° C.

13. The process of claim 12 wherein said heating step includes a holding period of from about 0.5 to 5 hours at approximately 300°±25° C.

14. The process of claim 13 wherein said heating step includes a holding period of from about 0.5 to 5 hours at approximately 500°±25° C.

15. The process of claim 14 wherein said heating step includes a holding period of from about 0.5 to 5 hours at approximately 700°±25° C.

16. The product of claim 1.

17. The microporous ceramic product of claim 16 having a surface area in excess of about 100 $m^2/gm$.

18. The microporous ceramic product of claim 17 having a surface area in excess of about 200 $m^2/gm$ and a micropore volume of greater than about 0.08 $cm^3/gm$.

* * * * *